(12) United States Patent
Choi

(10) Patent No.: US 8,139,009 B2
(45) Date of Patent: Mar. 20, 2012

(54) TRANSFLECTIVE LIQUID CRYSTAL DISPLAY PANEL AND APPARATUS AND METHOD OF DRIVING THE SAME

(75) Inventor: Su Seok Choi, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 717 days.

(21) Appl. No.: 10/878,479

(22) Filed: Jun. 29, 2004

(65) Prior Publication Data

US 2005/0134770 A1    Jun. 23, 2005

(30) Foreign Application Priority Data

Dec. 17, 2003  (KR) .................. 10-2003-0092692

(51) Int. Cl.
*G09G 3/36* (2006.01)
(52) U.S. Cl. .......................................... 345/87; 349/172
(58) Field of Classification Search .................... 345/87; 349/114, 141, 172
See application file for complete search history.

(56) References Cited

U.S. PATENT DOCUMENTS

| 6,281,952 | B1 * | 8/2001 | Okamoto et al. ............... 349/12 |
| 6,466,280 | B1 * | 10/2002 | Park et al. ........................ 349/43 |
| 6,798,473 | B2 * | 9/2004 | Kaneda et al. ................. 349/106 |
| 2003/0202139 | A1 * | 10/2003 | Choi et al. ..................... 349/113 |
| 2004/0104883 | A1 * | 6/2004 | Drader .......................... 345/102 |
| 2004/0227719 | A1 * | 11/2004 | Chang et al. .................. 345/102 |
| 2005/0062708 | A1 * | 3/2005 | Yoshihara et al. ............... 345/96 |

FOREIGN PATENT DOCUMENTS

| KR | 10-2002-0056928 | 7/2002 |
| KR | 10-2003-0057675 | 7/2003 |

* cited by examiner

*Primary Examiner* — Yong H Sim
(74) *Attorney, Agent, or Firm* — Morgan, Lewis & Bockius LLP

(57) ABSTRACT

A transflective liquid crystal display panel includes a ferroelectric liquid crystal cell operating in a half V-switching mode. The ferroelectric liquid crystal cell includes a reflective portion and a transmissive portion. A cell gap of the reflective portion is similar to a cell gap of the transmissive portion. A voltage applied to the ferroelectric liquid crystal cell depends on a brightness level of ambient light.

11 Claims, 13 Drawing Sheets

TRANSFLECTIVE LIQUID CRYSTAL DISPLAY PANEL AND APPARATUS AND METHOD OF DRIVING THE SAME

This application claims the benefit of Korean Patent Application No. 2002-092692 filed in Korea on Dec. 17, 2003, which is hereby incorporated by reference.

BACKGROUND OF THE INVENTION

1. Field of the Invention

The present invention relates to a liquid crystal display panel, and more particularly, to a transflective liquid crystal display panel and an apparatus and a method of driving the same capable of improving response time as well as providing a wide viewing angle.

2. Description of the Related Art

Generally, an active matrix liquid crystal display (LCD) device displays a natural moving picture by using a thin film transistor (hereinafter referred to as a TFT) as a switching device. Such an active matrix LCD device can be made smaller than a cathode ray tube CRT. Thus, active matrix LCD devices have been used as monitors for portable televisions and lap-top computers.

A liquid crystal display device is not self-luminous and thus, requires a separate light source. A liquid crystal display device may be classified as transmissive or reflective depending on the type of the light source. A transmissive liquid crystal display device includes two transparent substrates: an upper substrate and a lower substrate. A liquid crystal material is injected between the upper and the lower substrates. A backlight unit is positioned behind the lower substrate to project light onto a projection plane.

A reflective liquid crystal display device includes two transparent substrates: a rear substrate and a front substrate. A liquid crystal material is injected between the front and the rear surfaces. In contrast to the transmissive liquid crystal display device, the reflective liquid crystal display device has a specular surface formed on the rear substrate. The specular surface reflects an ambient light incident from the rear substrate through the front surface, which is the display surface. Alternately, the specular surface reflects a separate auxiliary light incident toward the display surface.

Recently, transflective liquid crystal display devices have been suggested that benefit from the advantages provided by both the transmissive type and the reflective type devices. In a transflective liquid crystal display device, if the level of externally applied ambient light is sufficient, the transflective liquid crystal display device does not require a back light unit. Instead, the transflective liquid crystal display device reflects the ambient light using a reflective plate. In this case, the transflective liquid crystal display device operates as a reflective liquid crystal display device. In contrast, if the level of externally applied ambient light is insufficient, the transflective liquid crystal display device uses a back light unit which provides light to a liquid crystal layer. In this case, the transflective liquid crystal display device operates as a transmissive liquid crystal display device.

FIG. 1 is a sectional view of a TN mode transflective liquid crystal display device according to related art. Referring to FIG. 1, the related art transflective liquid crystal display panel includes an upper plate UP and a lower plate DP formed with a liquid crystal material 18 therebetween, a reflective plate 6 formed in the lower plate DP, upper and lower retardation films 22 and 26, upper and lower polarizers 24 and 28 deposited on the exteriors of the upper plate UP and the lower plate DP, respectively, a scattering film 20 disposed between the upper retardation film 22 and an upper substrate 11, and a backlight unit 30 disposed on a rear surface of the lower polarizer 28.

The upper plate UP includes a black matrix 16, a color filter 12, a common electrode 14 and an upper alignment film (not shown) that are sequentially formed on the upper substrate 11. The black matrix 16 overlaps an area excluding a display area. The black matrix 16 prevents light leakage and absorbs ambient light, to thereby improve contrast. The color filter 12 is formed at an area partitioned by the black matrix 16 to selectively transmit light having a specific wavelength, thereby generating red R, green G and blue B lights. A common voltage is applied to the common electrode 14 to control movement of liquid crystal material.

The lower plate DP includes a TFT (not shown), a reflective plate 6, a pixel electrode 10 and a lower alignment film (not shown) formed on the lower substrate 1. The TFT is formed at a crossing of a gate line and a data line 4 and selectively supplies a data signal from the data line 4 to the pixel electrode 10 in response to a gate signal from the gate line. The pixel electrode 10 overlaps the reflective plate 6. A second passivation film 8 is positioned between the reflective plate 6 and the pixel electrode 10. The reflective plate 6 is made of aluminum within an area that overlaps a reflective portion RP on a first passivation film 2 to reflect ambient incident light.

The liquid crystal material 18 formed between the upper plate UP and the lower plate DP includes liquid crystal material of twisted nematic (TN) mode. The liquid crystal material of the TN mode has a twisted angle of 90° and transmits an incident light by changing its arrangement state when an electric field is applied thereto. The backlight unit 30 generates light required to display pictures when the liquid crystal panel operates in a transmissive mode.

Upper and a lower retardation films 22 and 26 are formed externally to the upper plate UP and the lower plate DP, respectively. The upper and lower retardation films compensate a phase difference, which causes a birefringence property. Specifically, a refractive index in a long-axis direction of the liquid crystal material differs from the refractive index in a short-axis direction of the liquid crystal material. The birefringence causes a difference in the polarization direction.

In the TN mode transflective liquid crystal display panel, the ambient light incident onto the reflective portion RP is reflected at the reflective plate 6 through the liquid crystal material 18 and is emitted back out of the liquid crystal display panel through the liquid crystal material 18. A visible ray generated at the backlight unit 30 and entering the transmissive portion TP propagates toward the liquid crystal material 18 through a transmissive hole TH to reach the display area. Specifically, a ray of light travels through the liquid crystal material 18 twice in the reflective portion RP. In contrast, a ray of light travels through the liquid crystal material 18 just for once in the transmissive portion TP.

Due to the foregoing property of the TN mode liquid crystal display panel, a cell gap in the reflective portion TP is made different than a cell gap in the transmissive portion TP to compensate for the optical phase difference. In other words, the reflective portion RP has a first cell gap d1 and the transmissive portion TP has a second cell gap d2. For example, the first cell gap d1 is about 3.5 μm.

The cell gaps d1 and d2 differ only by a depth of a through hole TH. Therefore, light transmittances of the transmissive portion TP and the reflective portion RP do not have a large difference, as known from following Equation 1.

$$T = 1 - \frac{\sin^2 \frac{\pi}{2}\sqrt{1+\mu^2}}{\sqrt{1+\mu^2}}$$ [Equation 1]

$$\mu = \frac{2d\Delta n}{\lambda}$$

In Equation 1, Δn represents a refractive index anisotropy, d represents a cell gap, which is the distance traveled by light through a liquid crystal layer, and λ represents a wavelength of the light.

FIG. 2 is a graph of light transmittance of the related art TN mode transflective liquid crystal display device depicted in FIG. 1. The light transmittances of the reflective portion RP and the transmissive portion TP randomly vary as shown in FIG. 2. Thus, it is difficult to optimize the brightness of the reflective portion RP and the transmissive portion TP. Further, the TN mode liquid crystal material 18 has a narrow viewing angle and a slow response speed.

FIG. 3 is a sectional view of an ECB mode transflective liquid crystal display device according to related art. A transflective liquid crystal display panel, which includes an electrically controlled birefringence (ECB) mode, has been proposed to overcome the problems associated with TN mode liquid crystal display panels. Referring to FIG. 3, the transflective liquid crystal display panel with the ECB mode includes an upper plate UP and a lower plate DP formed with a ECB liquid crystal material 19 therebetween. A reflective plate 6 is formed within the lower plate DP. Upper and lower retardation films 22 and 26 and upper and lower polarizers 24 and 28 are deposited on the exteriors of the upper plate UP and the lower plate DP, respectively. A scattering film 20 is positioned between the upper retardation film 22 and an upper substrate 11. A backlight unit 30 is positioned on a rear surface of the lower polarizer 28.

The upper plate UP includes a black matrix 16, a color filter 12, a common electrode 14 and an upper alignment film (not shown) that are sequentially formed on the upper substrate 11. The black matrix 16 is overlaps an area excluding a display area. The black matrix 16 prevents light leakage and absorbs ambient light, to thereby improve contrast. The color filter 12 is formed at an area partitioned by the black matrix 16 to selectively transmit light having a specific wavelength, thereby generating light of color red R, green G and blue B. A common voltage is applied to the common electrode 14 to control the movement of the liquid crystal material.

The lower plate DP includes a TFT (not shown), a reflective plate 6, a pixel electrode 10 and a lower alignment film (not shown) formed on the lower substrate 1. The TFT is formed at a crossing of a gate line and a data line 4 and selectively supplies a data signal from the data line 4 to the pixel electrode 10 in response to a gate signal from the gate line.

The reflective plate 6 covers a portion of an upper surface and a side surface of a first passivation film 2 around a first through hole TH1. The pixel electrode 10 overlaps the reflective plate 6. A second passivation film 8 is positioned between the reflective plate 6 and the pixel electrode 10. The reflective plate 6 is made of a reflective material at an area that overlaps the reflective portion RP to reflect an incident ambient light.

The pixel electrode 10 is formed on the second passivation film 8 and the second through hole TH2. The pixel electrode 10 overlaps the reflective plate 6 at an area partitioned by the data line 4 and the gate line. Further, the pixel electrode 10 is formed on the lateral side of the second passivation film 8 exposed by a second through hole TH2 on a substrate 1. The pixel electrode 10 is made of a transparent conductive material with a high light transmittance.

The reflective portion RP of the lower plate DP maintains a first cell gap d1 from the upper plate UP. The transmissive portion TP maintains a second cell gap d2 from the upper plate UP. The second cell gap d2 is twice the first cell gap d1.

FIG. 4 is a diagram illustrating a principle of operation of the related art ECB mode transflective liquid crystal display device depicted in FIG. 3. The liquid crystal material 19 provided between the upper plate UP and the lower plate DP includes liquid crystal material of an electrically controlled birefringence (ECB) mode in which liquid crystal cells are aligned parallel to alignment films (not shown) formed on the upper substrate 11 and the lower substrate and are moved in a direction parallel to the direction of an applied electric field. The backlight unit 30 generates light required for displaying pictures when the liquid crystal panel operates in transmissive mode.

Upper and lower retardation films 22 and 26 are formed on the exterior of the upper plate UP and the lower plate DP to compensate for a phase difference causing a birefringence property of the liquid crystal panel. Specifically, a refractive index in a long-axis direction of the liquid crystal material is different than a refractive index in a short-axis direction of the liquid crystal material causes. Birefringence causes a different direction of polarization.

Light transmittance of the transflective liquid crystal display panel of the ECB mode is expressed as Equation 2.

$$T = 1 - \frac{1}{2}\sin^2\left(\frac{\pi\Delta nd}{\lambda}\right)$$ [Equation 2]

In Equation 2, Δn represents a refractive index anisotropy, d represents a cell gap, which is the distance traveled by light through a liquid crystal layer, and λ represents a wavelength of the light.

FIG. 5 is a graph representing the light transmittance of the transflective liquid crystal display device of the ECB mode shown in FIG. 3. The light transmittance T is periodically repeated by a cell gap d as expressed by Equation 2. Specifically, the light transmittance of the reflective portion RP having the first cell gap is twice the light transmittance of the transmissive part TP having the second cell gap d2. The second cell gap d2 is twice the first cell gap d1 as shown in FIG. 5.

Accordingly, if the second cell gap d2 is formed larger than the first cell gap d1, the light transmittance T of the reflective portion RP becomes identical to the light transmittance T of the transmissive portion TP. Thus, it is possible to optimize the brightness of the reflective portion RP and the transmissive portion TP.

However, since the liquid crystal display panel of the ECB mode has a response speed of several tens of milliseconds and a narrow viewing angle, it is difficult to use the ECB mode liquid crystal display panel when a wide viewing angle is required. Further, since the response speed of the liquid crystal material is inversely proportional to the square of the cell gap, the response speeds of the transmissive portion and the reflective portion differ significantly. Accordingly, when displaying moving pictures, which require higher response time than still pictures, a quality of the displayed pictures through the transmissive portion and the reflective portion of the display device deteriorates.

In addition, in the liquid crystal display panel of the ECB mode, the liquid crystal material cannot be aligned uniformly in the inclined region A around the second through hole TH2. Thus, the liquid crystal display suffers from a disclination phenomenon, which causes a deterioration in picture quality.

SUMMARY OF THE INVENTION

Accordingly, the present invention is directed to a transflective liquid crystal display panel and an apparatus and a method of driving the same that substantially obviate one or more of the problems due to limitations and disadvantages of the related art.

An object of the present invention is to provide a transflective liquid crystal display panel with an improved response time.

Another object of the present invention is to provide a transflective liquid crystal display panel with a wide viewing angle.

Another object of the present invention is to provide an apparatus for driving a transflective liquid crystal display panel having an improved response time.

Another object of the present invention is to provide an apparatus for driving a transflective liquid crystal display panel having a wide the viewing angle.

Another object of the present invention is to provide a method of driving a transflective liquid crystal display panel to obtain an improved response time.

Another object of the present invention is to provide a method of driving a transflective liquid crystal display panel to obtain a wide the viewing angle.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, the transflective liquid crystal display panel includes a ferroelectric liquid crystal cell operating in a half V-switching mode. The ferroelectric liquid crystal cell includes a reflective portion and a transmissive portion. A cell gap of the reflective portion is similar to a cell gap of the transmissive portion. A voltage applied to the ferroelectric liquid crystal cell depends on a brightness level of ambient light.

In another aspect, the apparatus for driving a transflective liquid crystal panel includes a data driver that generates a first pixel voltage and a second pixel voltage different from each other depending on a brightness level of ambient light, and a transflective liquid crystal panel including a ferroelectric liquid crystal cell operating in a half V-switching mode to display images by using the first pixel voltage and the second pixel voltage. The ferroelectric liquid crystal cell includes a reflective portion and a transmissive portion. A cell gap of the reflective portion is similar to a cell gap of the transmissive portion.

In another aspect, the method of driving a ferroelectric liquid crystal display panel includes generating a first pixel voltage and a second pixel voltage different from each other depending on a brightness level of ambient light, and supplying one of the first pixel voltage and the second pixel voltage to a ferroelectric liquid crystal cell operating in a half V-switching mode to display images. The ferroelectric liquid crystal cell has a reflective portion and a transmissive portion. A cell gap of the reflective portion is similar to a cell gap of the transmissive portion.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention. In the drawings.

DETAILED DESCRIPTION OF THE PREFERRED EMBODIMENT

Reference will now be made in detail to the preferred embodiments of the present invention, examples of which are illustrated in the accompanying drawing.

Figure 1:
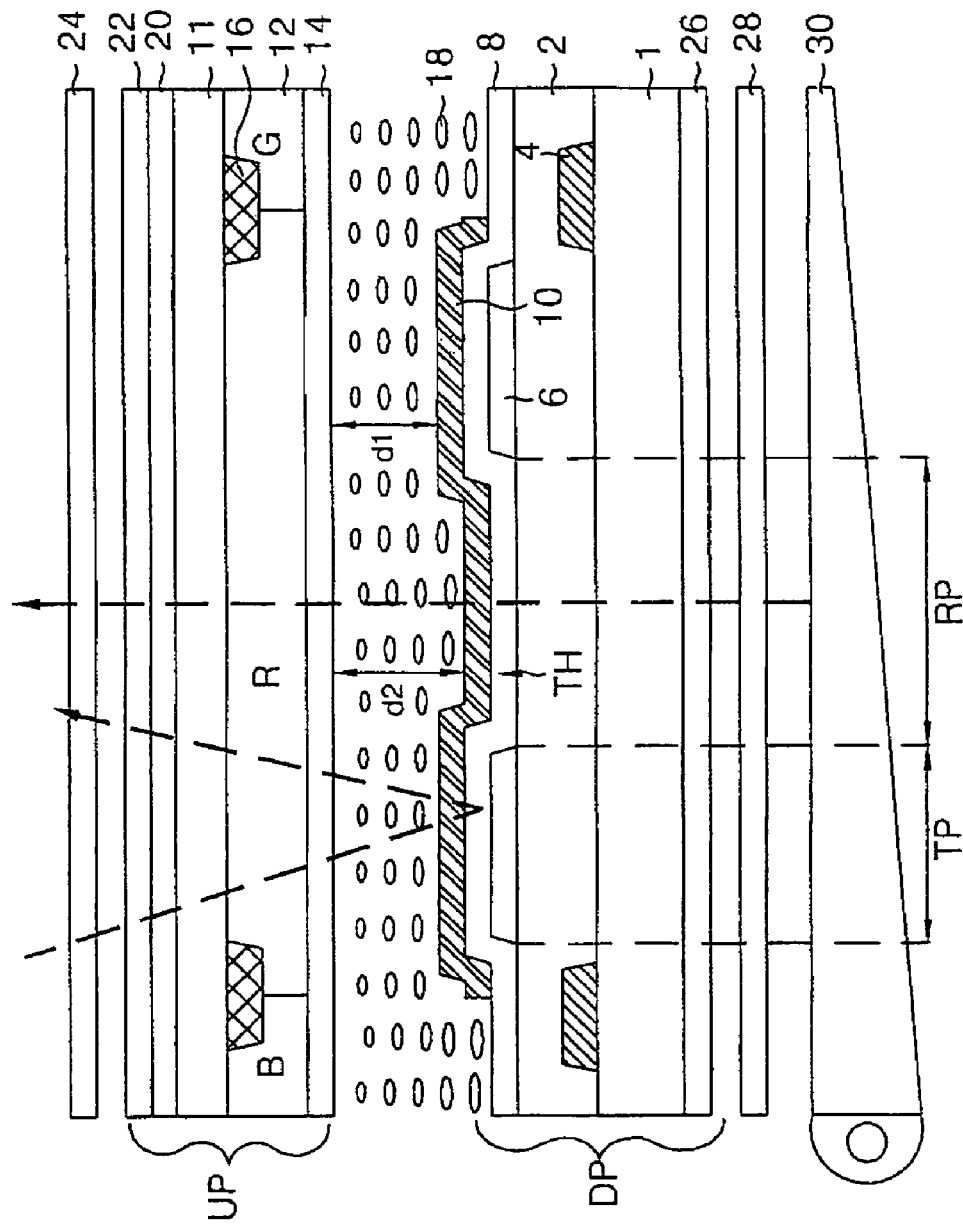
FIG. 1 is a sectional view of a TN mode transflective liquid crystal display device according to related art.
Figure 2:
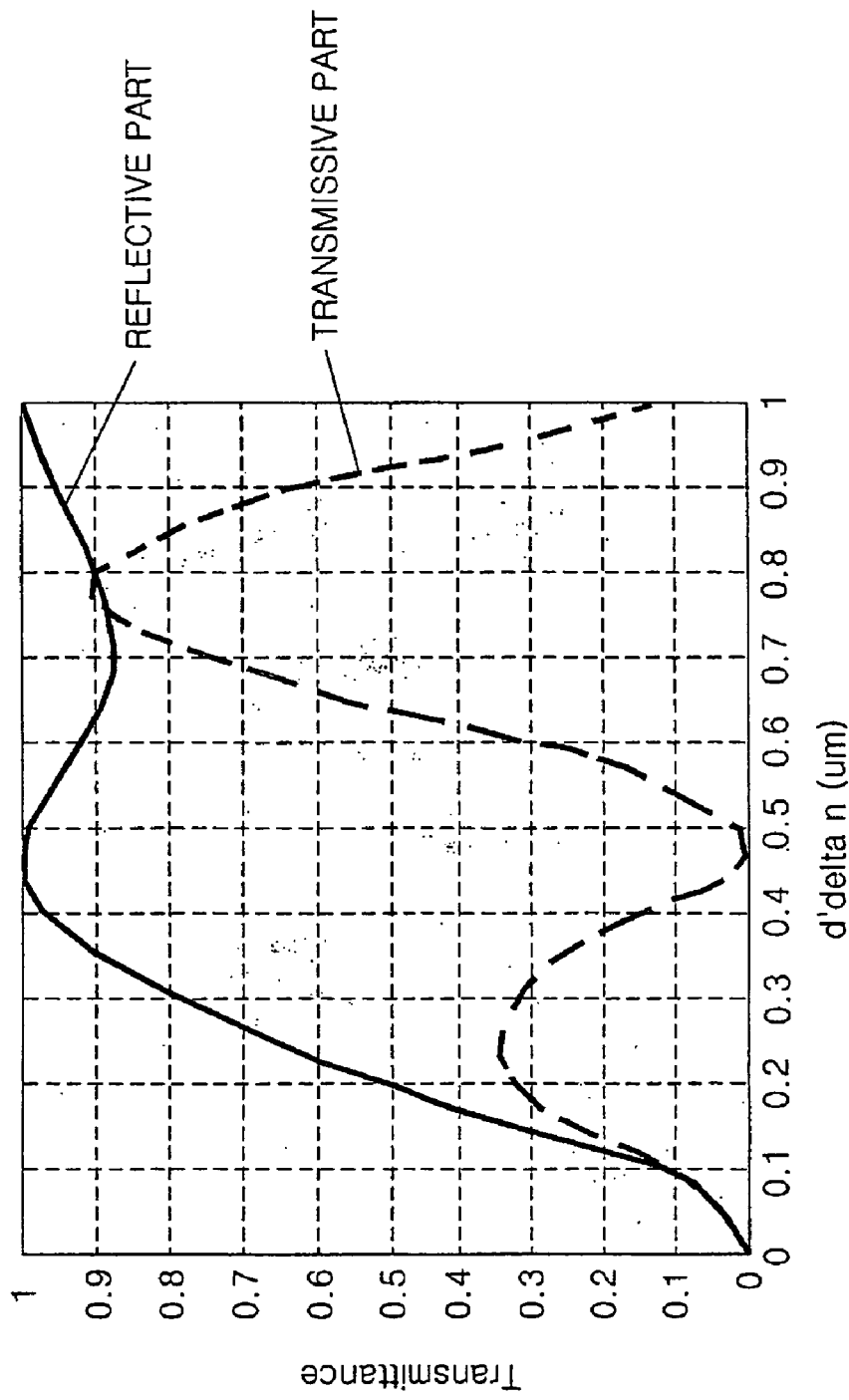
FIG. 2 is a graph of light transmittance of the related art TN mode transflective liquid crystal display device depicted in FIG. 1.
Figure 3:
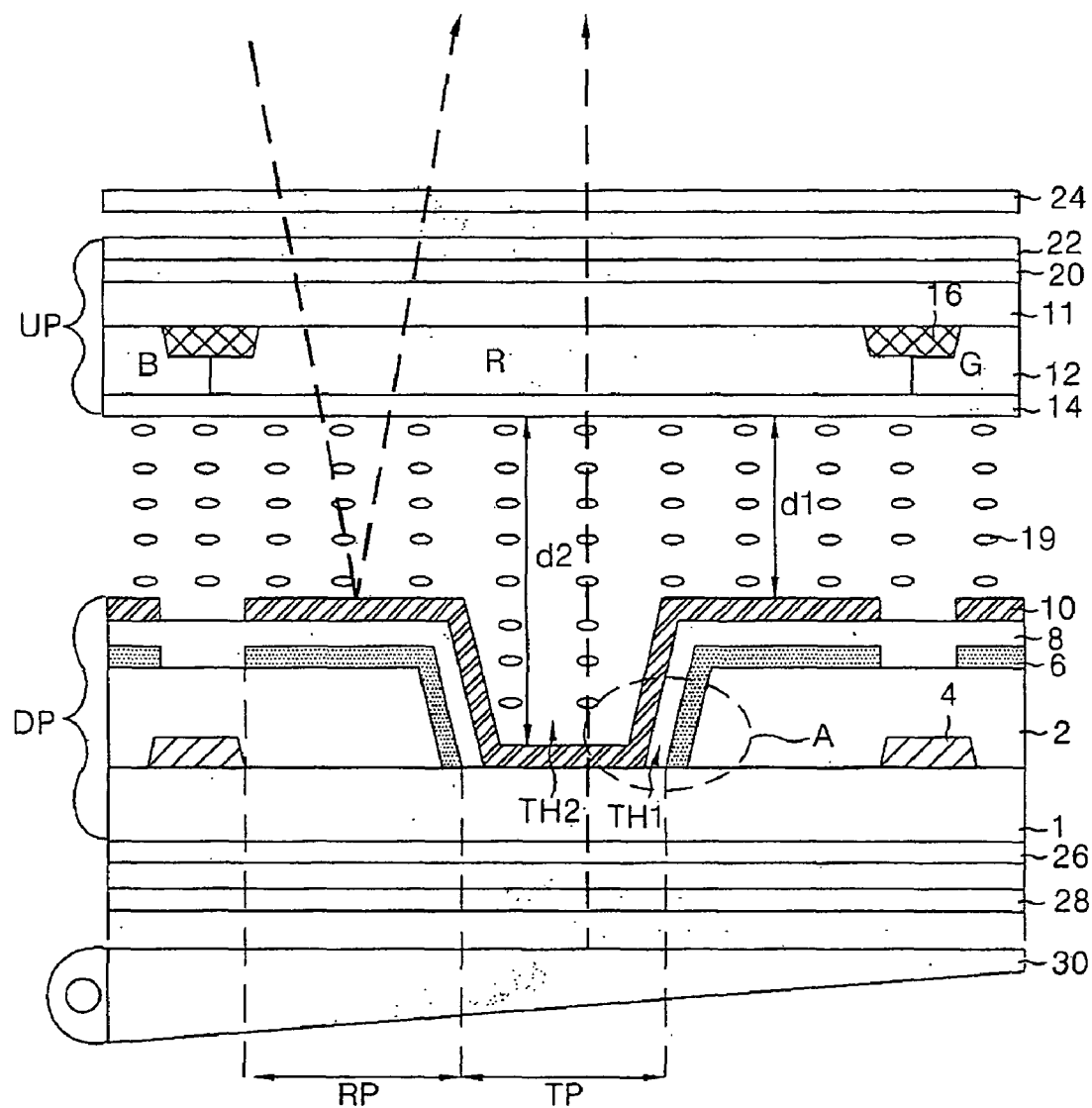
FIG. 3 is a sectional view of an ECB mode transflective liquid crystal display device according to related art.
Figure 4:
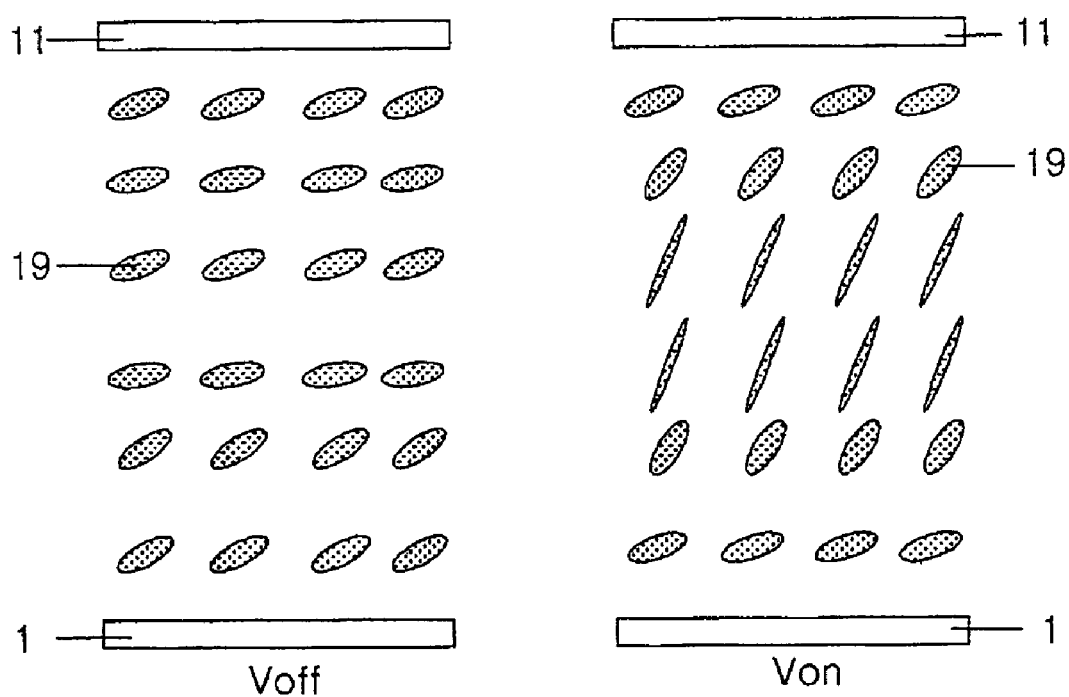
FIG. 4 is a diagram illustrating a principle of operation of the related art ECB mode transflective liquid crystal display device depicted in FIG. 3.
Figure 5:
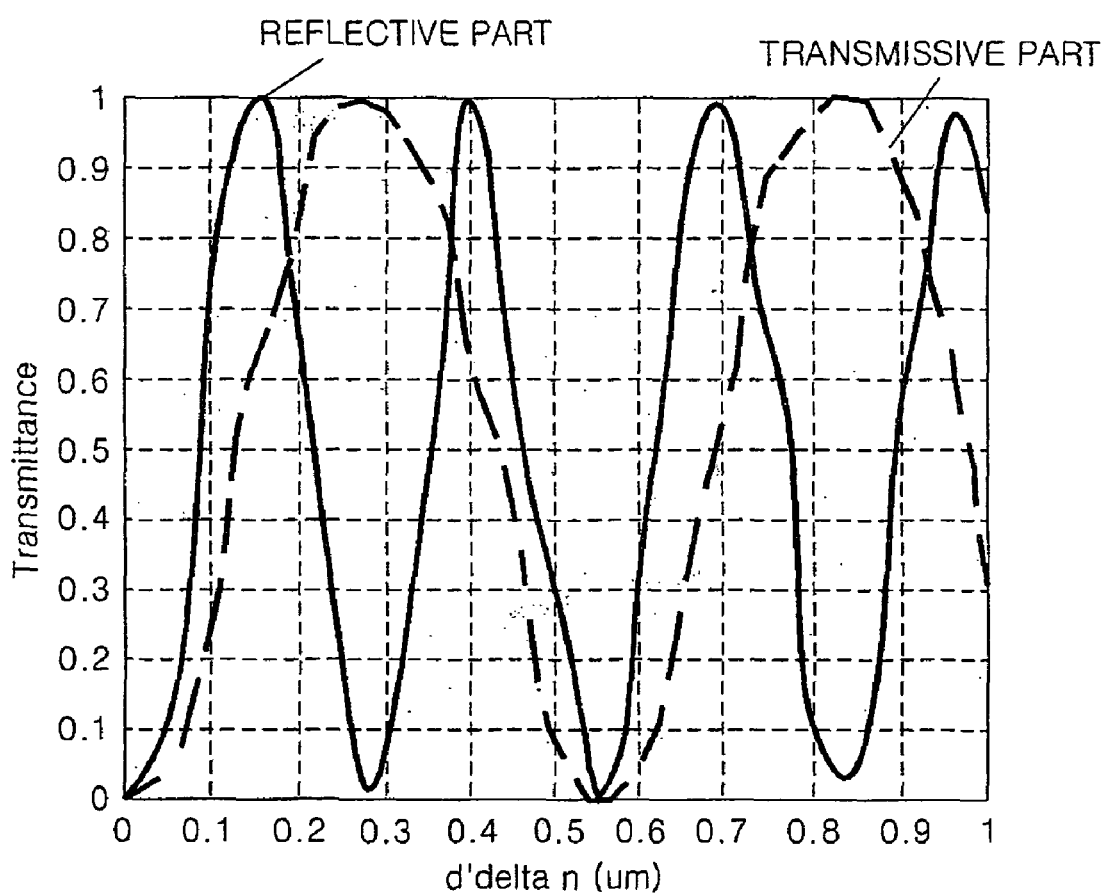
FIG. 5 is a graph representing the light transmittance of the transflective liquid crystal display device of the ECB mode shown in FIG. 3.
Figure 6:
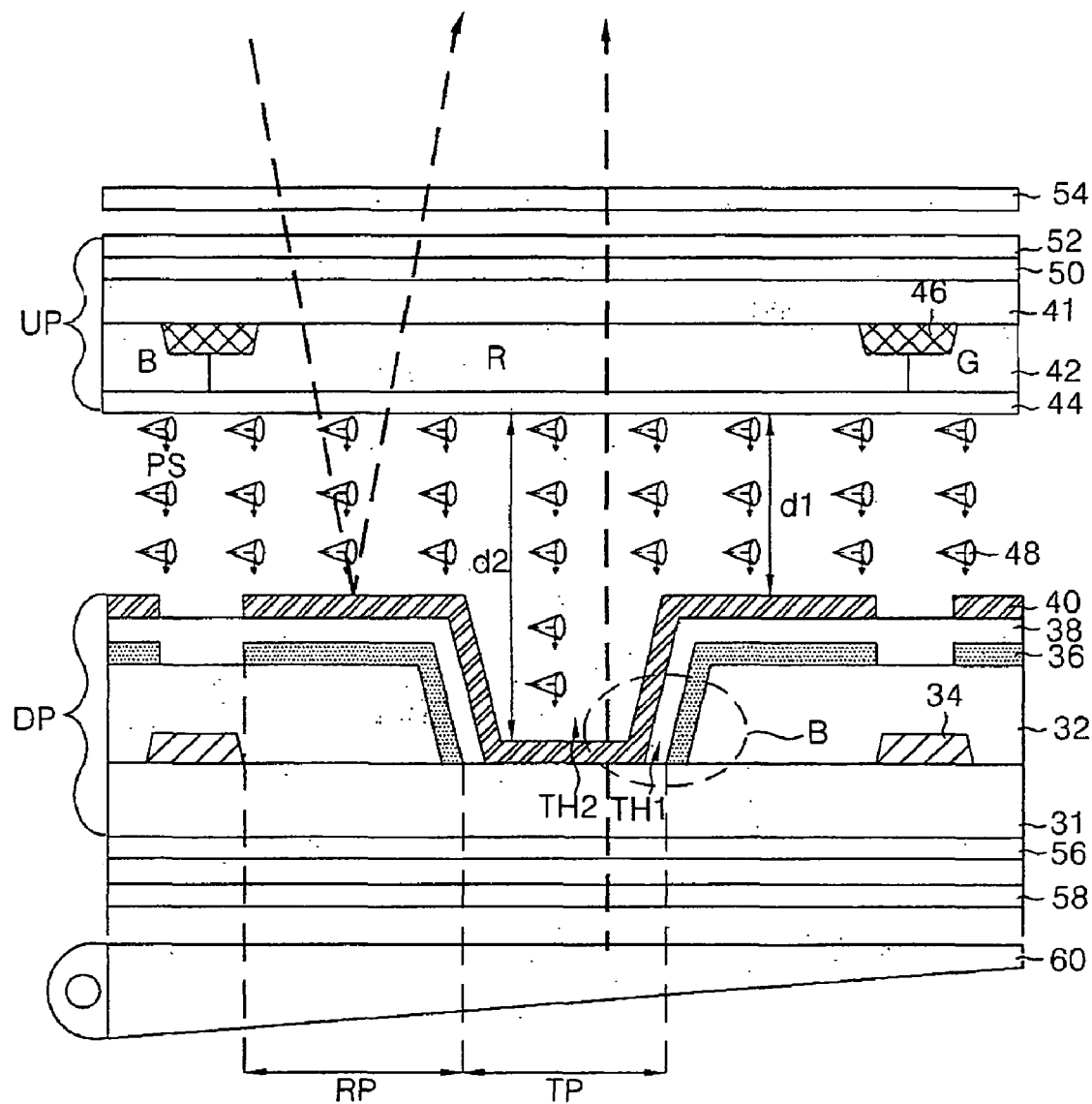
FIG. 6 is a sectional view of an exemplary transflective liquid crystal display panel having a ferroelectric liquid crystal material injected therein according to a first embodiment of the present invention.

FIG. 6 is a sectional view of an exemplary transflective liquid crystal display panel having a ferroelectric liquid crystal material injected therein according to a first embodiment of the present invention. The transflective liquid crystal display device shown in FIG. 6 includes an upper plate UP and a lower plate DP. A ferroelectric liquid crystal material 48 is positioned between the upper plate UP and the lower plate DP. A liquid crystal display with such a configuration is suitable for a moving picture display because the injection of the ferroelectric material 48 between the upper plate and the lower plate leads to a higher speed response characteristic in comparison with a TN mode liquid crystal cell or another type of liquid crystal cell.

The ferroelectric liquid crystal (FLC) material 48 has a layered structure with similar electric and magnetic properties. The FLC rotates along a virtual cone in response to an applied electric field. When the external electric field is not applied thereto, the ferroelectric liquid crystal material has a permanent, spontaneous polarization. When the external electric field is applied, the ferroelectric liquid crystal material rotates rapidly due to the interaction between the external electric field and the spontaneous polarization in a manner similar to the interaction between magnets. So, the response speed of the ferroelectric liquid crystal material is hundreds to as great as a thousand times faster than other types of liquid crystal material. Further, since the ferroelectric liquid crystal material has an inherent in-plane switching property, it can embody a wide viewing angle without the need for a special electrode structure or a compensation film.

The upper plate UP includes a black matrix 46, a color filter 42, a common electrode 44 and an upper alignment film (not shown) that are sequentially formed on the upper substrate 41. The black matrix 46 is formed so as to overlap an area except for a display area. The black matrix 46 prevents light leakage and absorbs ambient light to improve contrast. The color filter 42 is formed at an area partitioned by the black matrix 46 to selectively transmit light of a specific wavelength, thereby generating red R, green G and blue B colors. A common voltage is applied to the common electrode 44 to control the movement of a liquid crystal material.

The lower plate DP includes a TFT (not shown), a reflective plate 36, a pixel electrode 40 and a lower alignment film (not shown) formed on the lower substrate 31. The TFT is formed at a crossing of a gate line and a data line 34 and selectively supplies a data signal from the data line 34 to the pixel electrode 40 in response to a gate signal from the gate line. The reflective plate 36 covers a portion of an upper surface and a lateral side on a first passivation film 32 around a first through hole TH1. The reflective plate 36 overlaps the pixel electrode 40. A second passivation film 38 is positioned between the reflective plate 36 and the pixel electrode 40. The reflective plate 36 is made of a reflective material at an area overlapping the reflective portion RP. The reflective plate 36 reflects an incident ambient light. The pixel electrode 40 is formed on the second passivation film 38 and overlaps the reflective plate 36 at an area partitioned by the data line 34 and the gate line. Further, the pixel electrode 40 is formed on the lateral side of the second passivation film 38 exposed by a second through hole TH2 on a substrate 31. The pixel electrode 40 is made of a transparent conductive material with a high light transmittance.

An incident ambient light at a reflective portion RP of the lower plate DP is reflected from the reflective plate 36 via the FLC 48 and is provided to the FLC 48. The reflected light propagates through the FLC 48 and is emitted out of the liquid crystal display panel through an upper retardation film 52 and an upper polarizer 54.

A visible ray is generated at the backlight unit 30 to enter the transmissive portion TP via a lower polarizer 58 and a lower retardation film 56. The visible ray is transmitted to the FLC 48 through the first through hole TH1 and the second through hole TH2 to propagate toward the display area. Thus, a ray of light travels twice through the FLC 48 within the reflective portion RP. In contrast, a ray of light travels just once through the FLC 48 within the transmissive portion TP.

The reflective portion RP of the lower plate DP maintains a first cell gap d1 from the upper plate UP. The transmissive portion TP maintains a second cell gap d2 from the upper plate UP. The second cell gap d2 is twice the first cell gap d1.

A light transmittance T of the liquid crystal display panel using the FLC is periodically repeated in proportion to a cell gap d in accordance with Equation 3.

$$T = \sin^2 2\theta \sin^2\left(\frac{\pi d \Delta n}{\lambda}\right) \qquad \text{[Equation 3]}$$

In Equation 3, if the second cell gap d2 at the transmissive portion TP is twice the first cell gap d1 at the reflective portion RP, the light transmittance T of the reflective portion RP is identical to the light transmittance T of the transmissive portion TP. Thus, it is possible to optimize the brightness of the reflective portion RP and the transmissive portion TP. In this case, in the liquid crystal display panel using the FLC 48, the cell gap is in a range of about 2.0 μm~3.0 μm with respect to the transmissive portion in order to get a surface stability effect. For example, a cell gap of the reflective portion RP is in a range of about 1.3 μm and a cell gap of the transmissive portion TP is in a range of about 2.5 μm.

As described above, in accordance with embodiments of the present invention, the second cell gap d2 at the reflective portion RP is twice the cell gap d1 at the transmissive portion TP to optimize the transmittance of the reflective portion and the transmissive portion. In this case, since the liquid crystal material cannot be aligned uniformly within an inclined region B around the second through hole TH2, the liquid crystal display may suffer from a disclination phenomenon.

Figure 7:
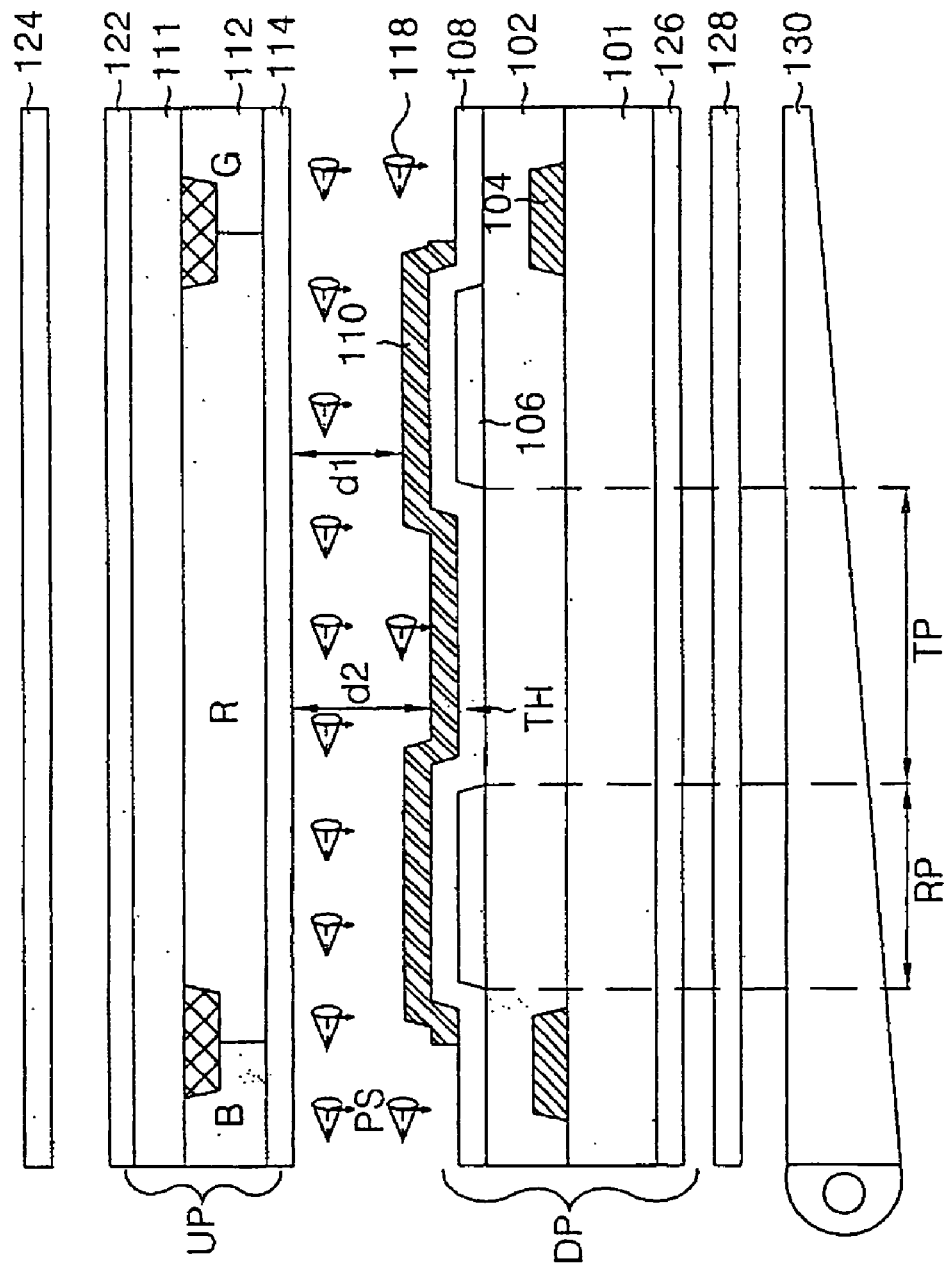
FIG. 7 is a sectional view illustrating an exemplary transflective liquid crystal display panel having a ferroelectric liquid crystal material operating in a half V-switching mode injected therein according to a second embodiment of the present invention.

FIG. 7 is a sectional view illustrating an exemplary transflective liquid crystal display panel having a ferroelectric liquid crystal material operating in a half V-switching mode injected therein according to a second embodiment of the present invention. The transflective liquid crystal display device depicted in FIG. 7 includes an upper plate UP and a lower plate DP. A ferroelectric liquid crystal material 118 operating in a half V-switching mode is positioned therebetween. A reflective plate 106 is formed in the lower plate DP. Upper and lower retardation films 122 and 126 and upper and lower polarizers 124 and 128 are deposited on the exteriors of the upper plate UP and the lower plate DP, respectively. A backlight unit 130 is disposed on a rear surface of the lower polarizer 128.

The backlight unit 130 generates light required for displaying pictures in a transmissive mode of a liquid crystal panel. Each of the upper and the lower retardation films 122 and 126 is formed at the exterior of the upper plate UP and the lower plate DP to compensate a phase difference causing a birefringence property of the liquid crystal display. The birefringence causes a refractive index in a long-axis direction of the liquid crystal material to differ from the refractive index along a short-axis direction of the liquid crystal material. Accordingly, the polarization direction is different. Each of the upper and the lower retardation film 122 and 126 has a wavelength plate of λ/4.

The upper plate UP includes a black matrix 116, a color filter 112, a common electrode 114 and an upper alignment film (not shown) that are sequentially formed on the upper substrate 111. The black matrix 116 overlaps an area excluding a display area. The black matrix 116 prevents light leakage and absorbs ambient light, to thereby improve contrast. The color filter 112 is formed at an area partitioned by the black matrix 116 to selectively transmit a light of specific wavelength, thereby generating red R, green G and blue B colors. A common voltage is applied to the common electrode 114 to control the movement of a liquid crystal material.

The lower plate DP includes a TFT (not shown), a reflective plate 106, a pixel electrode 110 and a lower alignment film (not shown) formed on the lower substrate 101. The TFT is formed at a crossing of a gate line and a data line 104 and selectively supplies a data signal from the data line 104 to the pixel electrode 110 in response to a gate signal from the gate line. The pixel electrode 110 overlaps the reflective plate 106. A second passivaion film 108 is positioned between the pixel electrode 110 and the reflective plate 106. The reflective plate 106 is made of aluminum at an area overlapping a reflective portion RP on a first passivation film 102. The reflective plate 106 reflects an incident ambient light. The pixel electrode 110 is disposed at a display area partitioned by the data line 4 and the gate line. Further, the pixel electrode 110 is made of a transparent conductive material with a high light transmittance.

The ambient light incident onto the reflective portion RP is reflected by the reflective plate 106 through the FLC 118 operating in the half V-switching mode and is emitted out of the liquid display panel through the FLC 118 again. In contrast, a visible ray, generated at the backlight unit 130 to enter the transmissive portion TP, is transmitted to the FLC 118 through a transmissive hole TH to propagate toward the display area.

A liquid crystal cell having such a configuration is suitable for displaying moving pictures because of the high-speed response and wide viewing angle characteristic caused by injecting the FLC 118 operating in a half V-switching mode between the upper plate UP and the lower plate DP. In addition, the liquid crystal cell has a relatively low capacitance suitable to be used in a liquid crystal display device.

Figure 8:
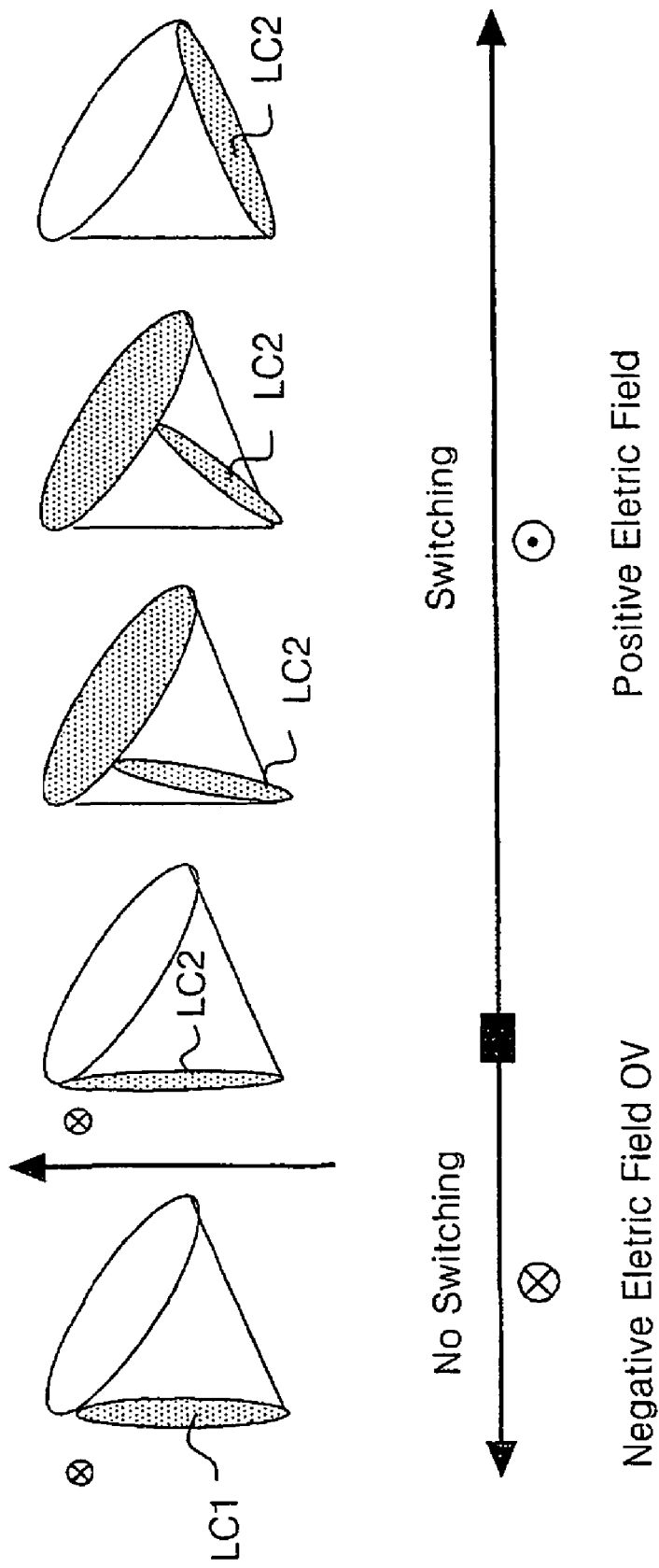
FIG. 8 depicts a configuration of an exemplary ferroelectric liquid crystal material operating in a half V-switching mode in reaction to an applied electric field.

FIG. 8 depicts a configuration of an exemplary ferroelectric liquid crystal material operating in a half V-switching mode in reaction to an applied electric field. In FIG. 8, the symbol ● represents a spontaneous polarization direction Ps of the FLC that is identical to an electric field direction of positive polarity. The symbol ⓧ represents a spontaneous polarization direction Ps of the FLC that is identical to an electric field direction of negative polarity.

If an electric field of negative polarity is applied to the liquid crystal cell shown in FIG. 8, a first liquid crystal material LC1 having spontaneous polarization direction Ps parallel to the electric field direction of negative polarity does not react to the electric field of negative polarity. In this case, the liquid crystal material remains in the initial spontaneous polarization direction. Similarly, if an electric field of positive polarity is applied to the liquid crystal cell, a first liquid crystal material LC1 having a spontaneous polarization direction Ps parallel to the electric field direction of positive polarity does not react to the electric field of positive polarity. In this case, the liquid crystal material remains in the initial spontaneous polarization direction.

On the contrary, a second liquid crystal material LC2 having negative spontaneous polarization direction rotates in reaction to an electric field of positive polarity. Concurrently, the spontaneous polarization direction Ps is changed from its initial state of negative polarization to a state of positive polarization, parallel to the electric field of positive polarity.

Similarly, a second liquid crystal material LC2 having positive spontaneous polarization direction rotates in reaction to an electric field of negative polarity. Concurrently, the spontaneous polarization direction Ps is changed from its initial state of positive spontaneous polarization to a state of negative polarization, parallel to the electric field of negative polarity.

When an incident light propagates through the second liquid crystal material LC2, the polarization direction of the incident light changes forward in a direction of a light emission side, which is the polarization direction of the polarizer in the upper plate. Thus, the incident light propagates through the polarizer in the upper plate.

On the contrary, an incident light that entered the first liquid crystal material LC1 maintains its polarization direction while entering the polarizer in the upper plate. Thus the incident light can not propagate through the polarizer in the upper plate.

As described above, in the liquid crystal cell of ferroelectric material with the half V-switching mode, as shown in FIG. 8, the direction of the second liquid crystal material LC2 continually rotates along a virtual cone according to a value of a voltage supplied to the liquid crystal material. In other words, as the voltage supplied to the liquid crystal cell increases, a rotation angle between an axis of the virtual cone and the direction of the liquid crystal material also increases.

The transmittances of the reflective portion RP and the transmissive portion TP are adjusted in accordance with the rotation angle. Specifically, a relatively low voltage is supplied to the liquid crystal cell in order to cause a small rotation angle for the reflective portion RP, where a ray of light propagates twice through the liquid crystal cell. In contrast, a relatively high voltage is supplied to the liquid crystal cell in order generate a large rotation angle for the transmissive portion TP, where a ray of light propagates only once.

Figure 9:
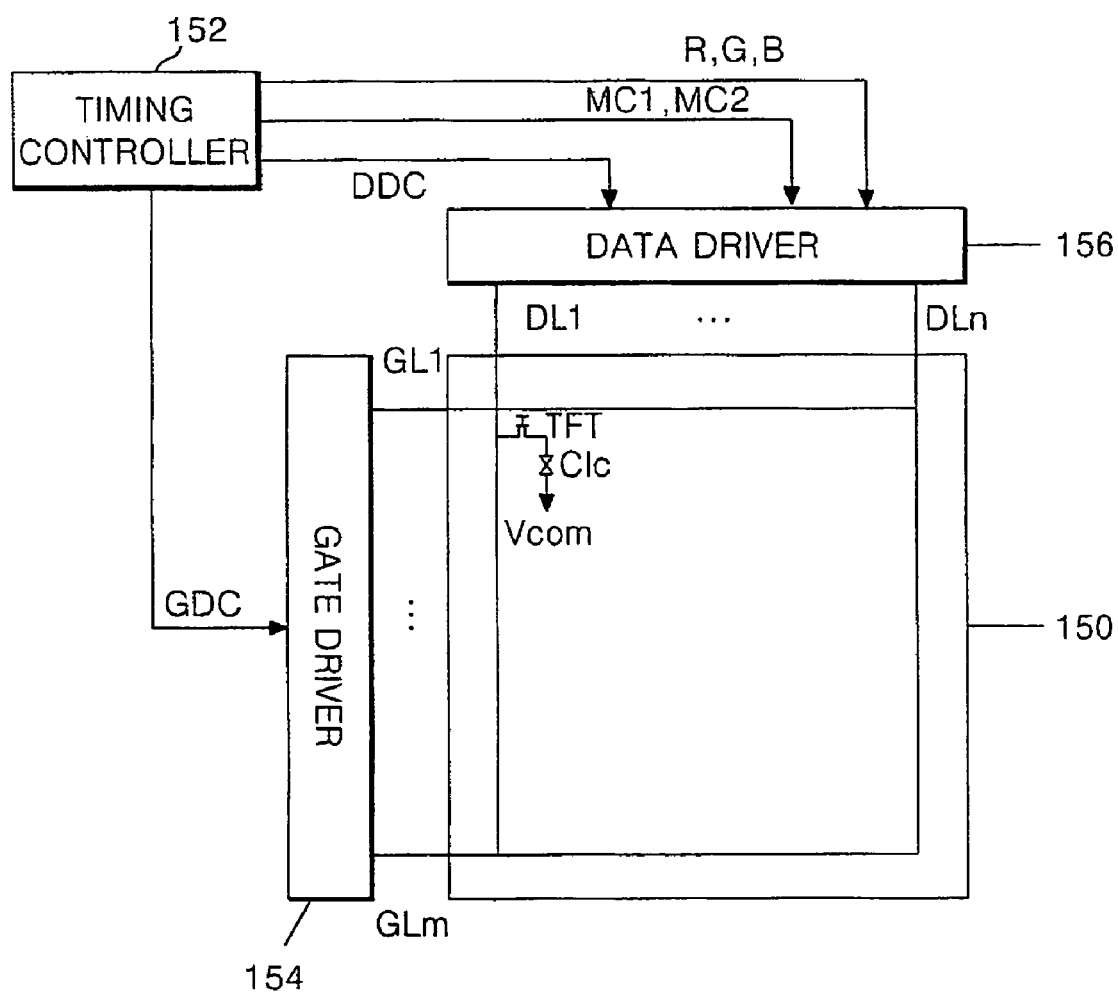
FIG. 9 is a block diagram of an exemplary apparatus for driving the liquid crystal display panel depicted in FIG. 7.

FIG. 9 is a block diagram of an exemplary apparatus for driving the liquid crystal display panel depicted in FIG. 7. The driving apparatus shown in FIG. 9 includes a data driver 156 for driving data lines DL of a liquid crystal panel 150, a gate driver 154 for driving gate lines GL of the liquid crystal panel 150, and a timing controller 152 for controlling the data driver 156 and the gate driver 154.

The timing controller 152 controls a driving timing of the gate driver 154 and the data driver 156 in response to externally provided control signals. The control signals include a clock signal, and horizontal and vertical synchronization signals supplied. Specifically, the timing controller 152 generates a gate control signal GDC in response to the externally supplied control signal and supplies the gate control signal GDC to the gate driver 154. Further, the timing controller 152 generates a data control signal DDC in response to the externally supplied control signal and supplies the data control signal DDC to the data driver 156. In addition, the timing controller 152 supplies externally provided R, G and B pixel data to the data driver 156.

Moreover, the timing controller 152 generates mode signals MC1 and MC2 for selecting a mode of the transflective liquid crystal panel in accordance with the brightness of ambient light, and supplies the mode signal to the data driver 156. In other words, if the ambient light is bright, the timing controller 152 supplies the reflective mode signal MC1 to the data driver 156 in order to drive the liquid crystal panel 150 in reflective mode. If the ambient light is dark, the timing driver 152 supplies the transmissive mode signal MC2 to the data driver 156 in order to drive the liquid crystal panel 150 in transmissive mode. Alternatively, a separate mode signal generator may be used to generate either the reflective mode signal MC1 or the transmissive mode signal MC2 to be supplied to the data driver 156.

The gate driver 154 sequentially supplies a gate high voltage to the gate lines GL1 to GLn in response to gate control signals GDC from the timing controller 152. Hereby, the gate driver 154 drives the thin film transistor TFT connected to the gate lines GL one gate line at a time.

The data driver 156 supplies the pixel signal corresponding to one horizontal line for each horizontal period (H1, H2, . . . ) to the data lines DL1 to DLm in response to the data control signals DDC from the timing controller 152. At this time, the data driver 156 converts R, G, B digital pixel signals from the timing controller 152 into analog pixel signals by using a gamma voltage from a gamma voltage generator (not shown).

Specifically, if the reflective mode signal MC1 is supplied from the timing controller 152 to the data driver 156, the data driver 156 supplies an analog pixel signal of a first voltage level to the data lines DL. If the transmissive mode signal MC2 is supplied from the timing controller 152 to the data driver 156, the data driver 156 amplifies the analog pixel signal of the first voltage level. Thus the data driver 156 supplies an analog pixel signal of a second voltage level to the data line DL. Further, if the transmissive mode signal MC2 is supplied from the timing controller 152 to the data driver 156, the data driver 156 supplies the analog signal of the second voltage level to the data line DL. If the reflective mode signal MC1 is supplied from the timing controller 152 to the data driver 156, the data driver 156 reduces the analog pixel signal of the second voltage level to supply the analog pixel signal corresponding to the first voltage level to the data line DL.

Alternatively, the data driver 156 may include a first data driver and a second data driver for generating a pixel signal corresponding to each of the reflective mode and the transmissive mode. In this case, the first data driver generates the analog pixel signal of the first voltage level corresponding to the reflective mode signal MC1 by using a first gamma voltage. The second data driver generates the analog pixel signal of the second voltage level corresponding to the transmissive mode signal MC2 by using a second gamma voltage.

Figure 10:
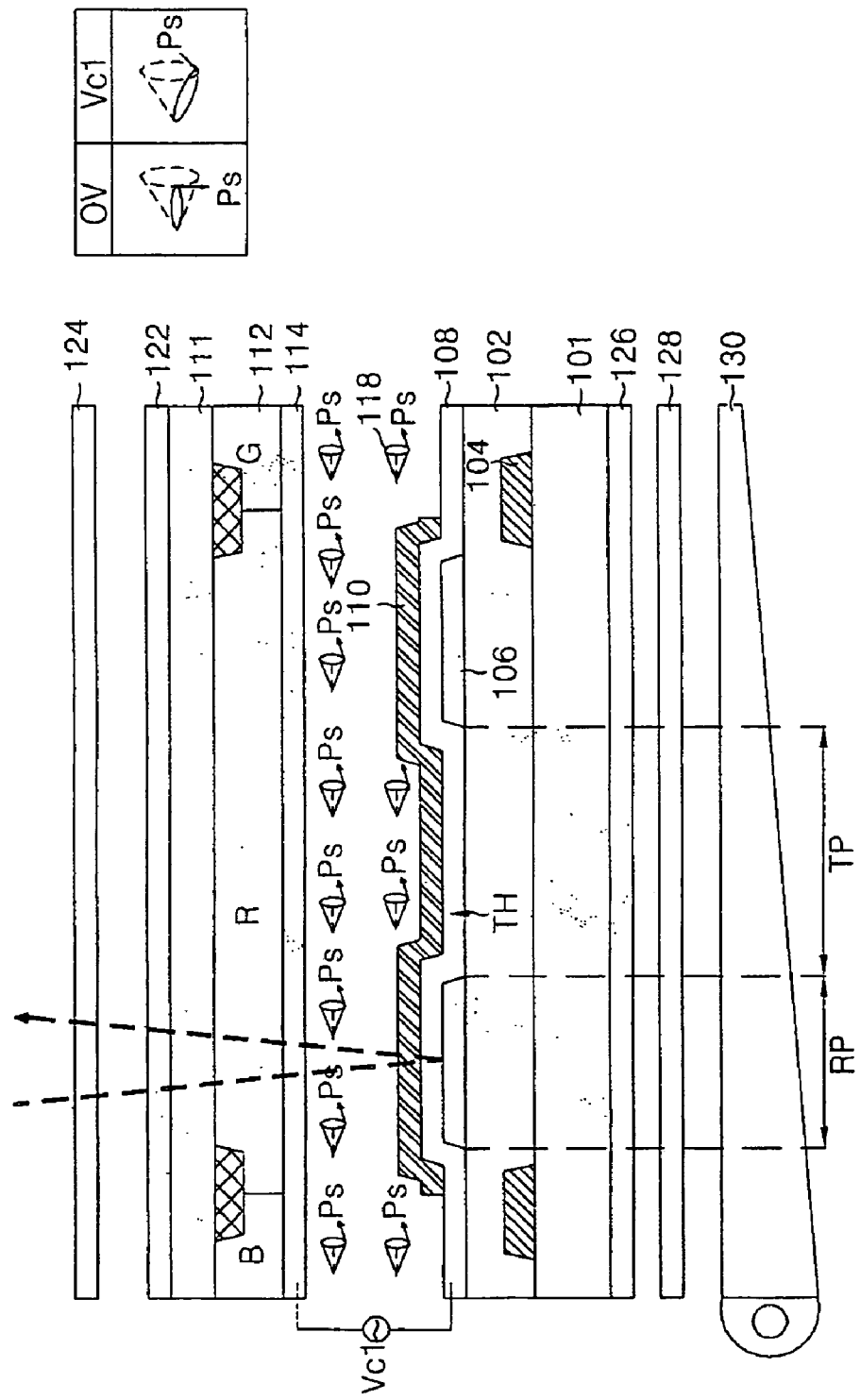
FIG. 10 is a diagram of an exemplary implementation of the liquid crystal display panel operating in a reflective mode when driven by a relatively low pixel voltage signal generated by the exemplary apparatus for driving the liquid crystal display panel depicted in FIG. 9.

FIG. 10 is a diagram of an exemplary implementation of the liquid crystal display panel operating in a reflective mode when driven by a relatively low pixel voltage signal generated by the exemplary apparatus for driving the liquid crystal display panel depicted in FIG. 9. As described above, the pixel voltage, which is supplied to the pixel electrode via the data line DL of the liquid crystal panel, varies depending on a mode of the liquid crystal panel.

More particularly, if the liquid crystal panel is operating in reflective mode, the liquid crystal cell with half V-switching mode receives a pixel signal of a relatively low first voltage, which is supplied to the pixel electrode 110 via the data line 104, as shown in FIG. 10. A potential difference Vc1 between the first voltage for the pixel signal and a common voltage is supplied to the common electrode 114. Accordingly, the direction of the liquid crystal material is rotated by an angle θ. Thus, the liquid crystal material has a second phase difference refractive value (A/2), which is one half of a first phase difference refractive value (A). Then, when a ray of light in the reflective portion RP travels twice through a liquid crystal layer with half V-switching mode, a variation in retardation is represented as "2×d×A/2=dA", where d is a cell gap. Accordingly, the amount of light propagated through the liquid crystal panel operating in reflective mode is relatively low as the direction of the liquid crystal material rotates by an angle of θ.

Figure 11:
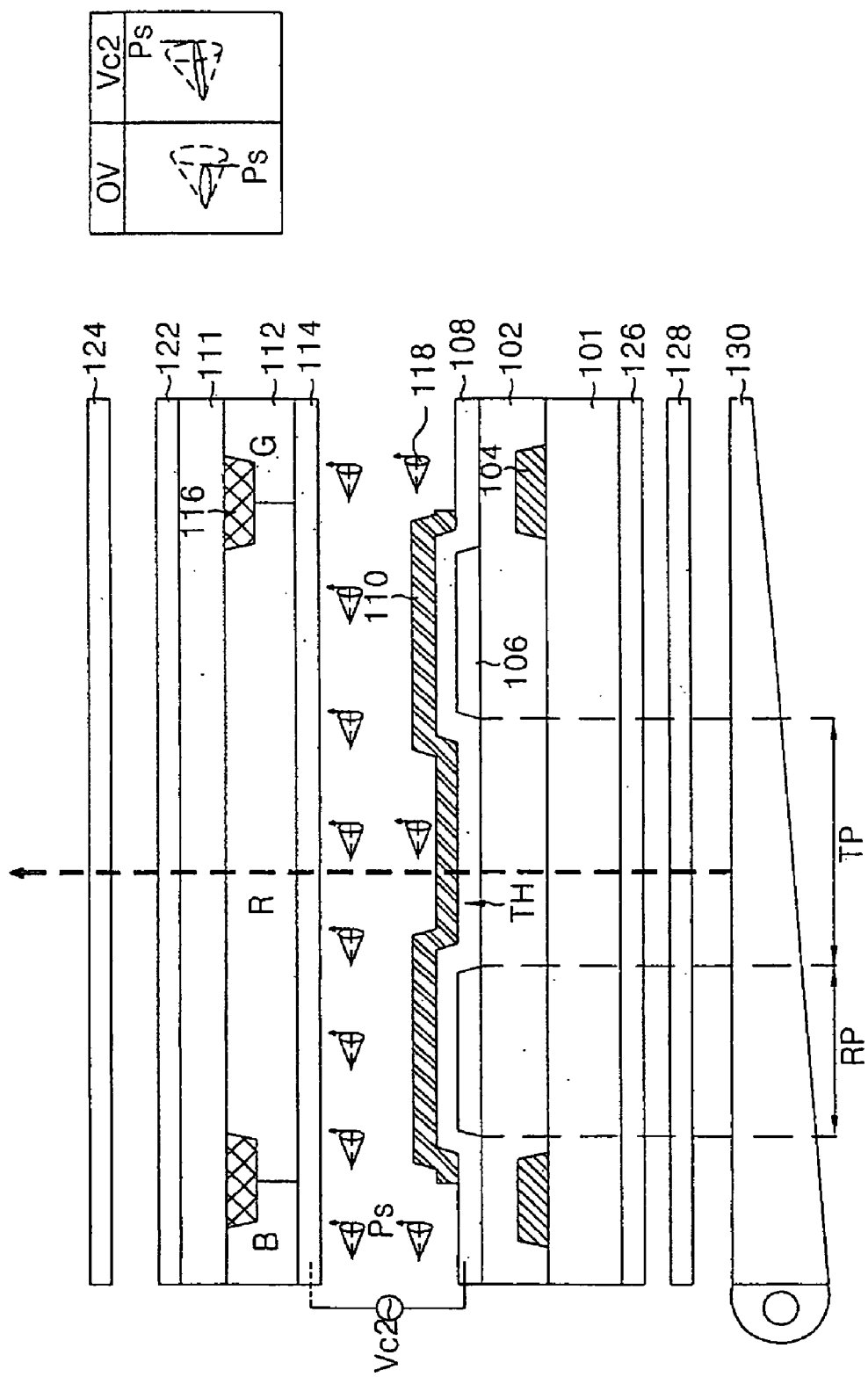
FIG. 11 is a diagram of an exemplary implementation of the liquid crystal display panel operating a transmissive mode when driven by a relatively high pixel voltage level generated by the exemplary apparatus for driving the liquid crystal display panel depicted in FIG. 9.

FIG. 11 is a diagram of an exemplary implementation of the liquid crystal display panel operating a transmissive mode when driven by a relatively high pixel voltage level generated by the exemplary apparatus for driving the liquid crystal display panel depicted in FIG. 9. If the liquid crystal panel is operating in transmissive mode, the liquid crystal cell with half V-switching mode receives the pixel signal of the relatively high second voltage, which is supplied to the pixel electrode 110 via the data line 104, as shown in FIG. 11. The direction of the liquid crystal material is rotated by an angle nθ (where, n is an integer larger than 1), for example, by an angle 2θ. A potential difference Vc2 between the first voltage for the pixel signal and a common voltage is supplied to the common electrode 114. Accordingly, the liquid crystal material has a second phase difference refractive value (A/2), which is one half of a first phase difference refractive value (A). Then, a ray of light travelling only once through the transmissive portion TP of a liquid crystal layer with half V-switching mode has a variation in retardation represented by "d×A=dA" (where d is a cell gap). Therefore, the variations in retardation of the liquid crystal material at the reflective portion RP and the transmissive portion TP are identical to each other. Accordingly, a large amount of light propagates through the liquid crystal panel operating in transmissive mode as the direction of the liquid crystal material rotates by an angle of nθ.

Figure 12:
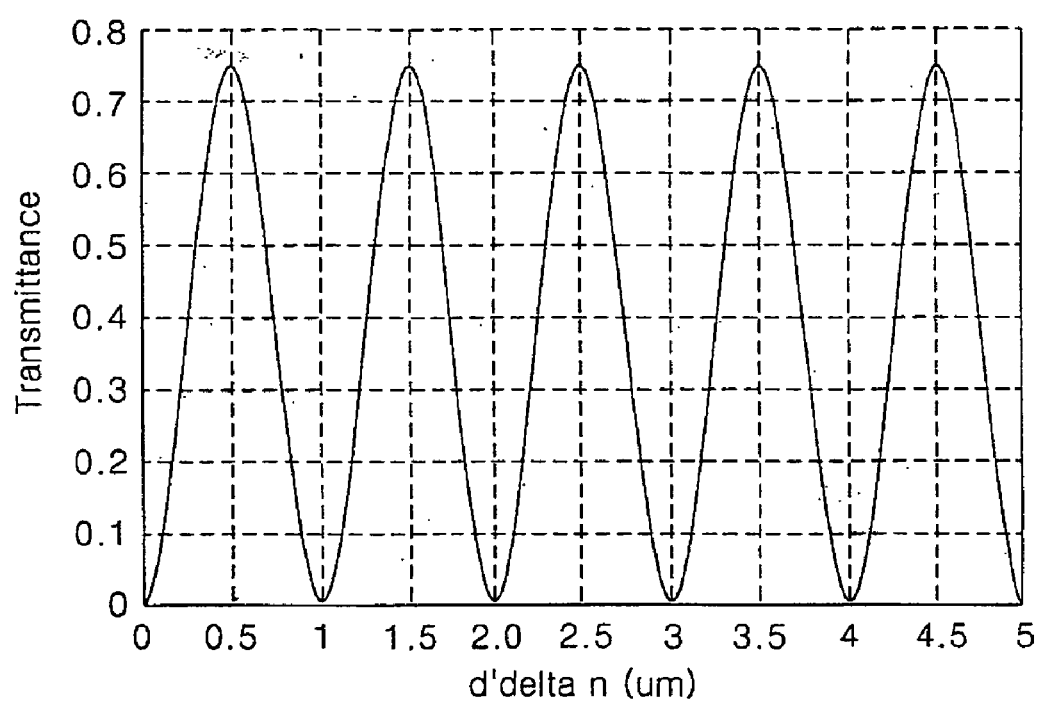
FIG. 12 is a graph representing the light transmittance of the liquid crystal display device including the ferroelectric liquid crystal material operating in a half V-switching mode according to the second embodiment of the present invention.

FIG. 12 is a graph representing the light transmittance of the liquid crystal display device including the ferroelectric liquid crystal material operating in a half V-switching mode according to the second embodiment of the present invention. As described above, the transflective liquid crystal display device according to the second embodiment of the present invention supplies different pixel voltages to the reflective portion and the transmissive portion to adjust the rotation angle in accordance with a location of the liquid crystal material. Accordingly, as shown in FIG. 12, the light transmittance of the reflective portion and the light transmittance of the transmissive portion is the same. Thereby brightness is optimum and the cell gap of the transmissive portion and the reflective portion are similar. Thus, a deterioration of picture quality due, for example, to disclination can be prevented. Further, in a transflective liquid crystal display panel using a ferroelectric liquid crystal material with half V-switching mode, the response speed is less than about 1 ms because a response speed is determined by a spontaneous polarization value of a liquid crystal material rather than a cell gap of a liquid crystal material at the time of a surface stabilization. Thus, a transflective liquid crystal display panel using a ferroelectric liquid crystal material with half V-switching mode is relatively fast in comparison with a transflective liquid crystal display panel applying a ECB mode. Therefore, since a difference in response speed between a reflective mode or a transmissive mode is not large, display quality is improved when displaying moving pictures, which require a fast response.

Figure 13:
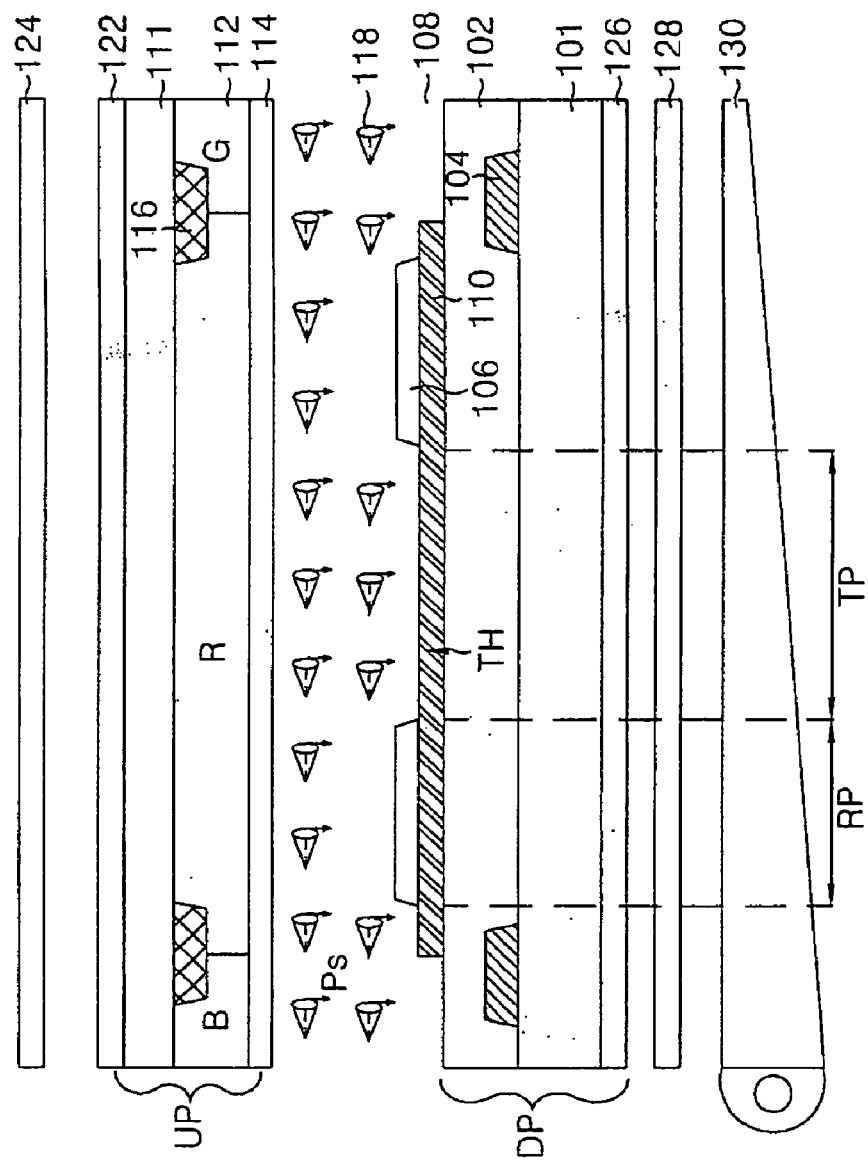
FIG. 13 is a sectional view of another exemplary transflective liquid crystal display panel having injected therein the ferroelectric liquid crystal material depicted in FIG. 7.

FIG. 13 is a sectional view of another exemplary transflective liquid crystal display panel having injected therein the ferroelectric liquid crystal material depicted in FIG. 7. A liquid crystal display panel shown in FIG. 13 may be employed instead of the transflective liquid crystal display panel shown in FIG. 7. In this case, the liquid crystal display panel shown in FIG. 13 includes a pixel electrode 110 formed on a first passivation film 102 to protect a thin film transistor and a reflective plate 106 overlapping a reflective portion RP on the pixel electrode 110.

As described above, according to the transflective liquid crystal display panel and a method of driving the same according to the present invention, different voltages are supplied to the liquid crystal cell depending on the mode of operation of the liquid crystal panel. Accordingly, it is possible to form the liquid crystal material having a structure of a single cell gap, and thus it is possible to optimize a light efficiency in a transmissive portion and a reflective portion of the liquid crystal display.

It will be apparent to those skilled in the art that various modifications and variations can be made in embodiments the present invention without departing from the spirit or scope of the invention. Thus, it is intended that the present invention cover the modifications and variations of this invention provided they come within the scope of the appended claims and their equivalents.

What is claimed is:

1. A transflective liquid crystal display panel, comprising:
   a ferroelectric liquid crystal cell operating in a half V-switching mode to realize a high-speed response and a wide viewing angle, the ferroelectric liquid crystal cell having a pixel region including a reflective portion and a transmissive portion, wherein a voltage applied to the ferroelectric liquid crystal cell depends on a brightness level of ambient light,
   wherein the ferroelectric liquid crystal cell includes:
   an upper substrate having a common electrode;
   a lower substrate;
   a first passivation film formed on the lower substrate and having a plane upper surface;
   a reflective plate formed on the first passivation film corresponding to the reflective portion;
   a second passivation film formed on the first passivation film and the reflective plate; and
   a pixel electrode formed on the second passivation film corresponding to the reflective portion and the transmissive portion, the pixel electrode being integrally formed within the pixel region;
   an alignment film formed on the pixel electrode; and
   a ferroelectric liquid crystal material operating in the half V-switching mode injected between the upper substrate and the lower substrate,
   wherein a first pixel voltage is supplied to the pixel electrode of the reflective portion and the transmissive portion in a reflective mode, and a second pixel voltage is supplied to the pixel electrode of the reflective portion and the transmissive portion in a transmissive mode,
   wherein the second pixel voltage is higher than the first pixel voltage,
   wherein a direction of the ferroelectric liquid crystal material in the reflective mode is rotated by an angle θ by applying the first pixel voltage,
   wherein a direction of the ferroelectric liquid crystal material in the transmissive mode is rotated by an angle nθ by applying the second pixel voltage,
   wherein n is integer larger than 1,
   wherein the pixel electrode of the reflective portion and the transmissive portion is formed between the second passivation film and the alignment film, and
   wherein the second pixel voltage is produced from the first pixel voltage.

2. The transflective liquid crystal display panel of claim 1, further comprising a back light unit supplying light to the liquid crystal display panel during the operation of a transmissive mode.

3. An apparatus for driving a transflective liquid crystal panel, comprising:
   a data driver that selectively generates a first pixel voltage and a second pixel voltage higher than the first pixel voltage according to a reflective mode and a transmissive mode; and
   a transflective liquid crystal panel including a ferroelectric liquid crystal cell operating in a half V-switching mode to display images, wherein the ferroelectric liquid crystal cell has a pixel region including a reflective portion and a transmissive portion,
   wherein the ferroelectric liquid crystal cell includes:
   an upper substrate having a common electrode;
   a lower substrate;
   a first passivation film formed on the lower substrate and having a plane upper surface;
   a reflective plate formed on the first passivation film corresponding to the reflective portion;
   a second passivation film formed on the first passivation film and the reflective plate; and
   a pixel electrode formed on the second passivation film corresponding to the reflective portion and the transmissive portion, the pixel electrode being integrally formed within the pixel region;
   an alignment film formed on the pixel electrode; and
   a ferroelectric liquid crystal material operating in the half V-switching mode injected between the upper substrate and the lower substrate,
   wherein the first pixel voltage is supplied to the pixel electrode of the reflective portion and the transmissive portion in the reflective mode, and the second pixel voltage is supplied to the pixel electrode of the reflective portion and the transmissive portion in the transmissive mode,
   wherein a direction of the ferroelectric liquid crystal material in the reflective mode is rotated by an angle θ by applying the first pixel voltage,
   wherein a direction of the ferroelectric liquid crystal material in the transmissive mode is rotated by an angle nθ by applying the second pixel voltage,
   wherein n is integer larger than 1,
   wherein the pixel electrode of the reflective portion and the transmissive portion is formed between the second passivation film and the alignment film, and
   wherein the second pixel voltage is produced from the first pixel voltage.

4. The apparatus of claim 3, further comprising:
   a timing controller that is coupled to the data driver; and
   a mode controller that generates a reflective mode signal and a transmissive mode signal and selectively supplies the reflective mode signal and the transmissive mode signal to the data driver, the reflective mode signal and the transmissive mode signal selecting, respectively, the transmissive mode and the reflective mode in the liquid crystal panel depending on the brightness level of ambient light.

5. The apparatus of claim 3, wherein n is 2.

6. The apparatus of claim 4, wherein the mode controller is incorporated in the timing controller.

7. The apparatus of claim 4, wherein the data driver generates the first pixel voltage in response to the reflective mode signal and generates the second pixel voltage in response to the transmissive mode signal.

8. The apparatus of claim 7, wherein the liquid crystal material rotates by a larger rotation angle in response to the second pixel voltage than in response to the first pixel voltage.

9. A method of driving a ferroelectric liquid crystal display panel having a ferroelectric liquid crystal cell operating in a half V-switching mode including an upper substrate, a lower substrate and a ferroelectric liquid crystal material, wherein the ferroelectric liquid crystal cell having a pixel region including a reflective portion and a transmissive portion, the lower substrate includes a first passivation film formed on the lower substrate and having a plane upper surface, a reflective plate formed on the first passivation film corresponding to the reflective portion, a second passivation film formed on the first passivation film and the reflective plate, a pixel electrode formed on the second passivation film corresponding to the reflective portion and the transmissive portion, and an alignment film formed on the pixel electrode, comprising:

selectively generating a first pixel voltage and a second pixel voltage higher than the first pixel voltage according to a reflective mode and a transmissive mode;

supplying the first pixel voltage to the pixel electrode of the reflective portion and the transmissive portion in the reflective mode;

rotating the ferroelectric liquid crystal material by an angle θ by applying the first pixel voltage;

supplying the second pixel voltage to the pixel electrode of the reflective portion and the transmissive portion in the transmissive mode; and rotating the ferroelectric liquid crystal material by an angle nθ by applying the second pixel voltage, wherein n is integer larger than 1, wherein the pixel electrode of the reflective portion and the transmissive portion is formed between the second passivation film and the alignment film, and wherein the second pixel voltage is produced from the first pixel voltage.

10. The method of claim 9, further comprising the step of generating a reflective mode signal and a transmissive mode signal, the reflective and transmissive mode signals selecting, respectively, one of the transmissive mode and the reflective mode of the liquid crystal panel depending on the brightness of ambient light.

11. The method of claim 10, wherein the step of selectively generating the first pixel voltage and the second pixel voltage includes:

generating the first pixel voltage in response to the reflective mode signal; and generating the second pixel voltage in response to the transmissive mode signal.

* * * * *